United States Patent Office 3,178,378
Patented Apr. 13, 1965

3,178,378
SUBBING LAYER FOR HYDROPHOBIC, DIMENSIONALLY STABLE, INERT-SURFACED PHOTOGRAPHIC FILMBASE
Alan M. Winchell, Windsor, N.Y., assignor to General Aniline & Film Corporation, New York, N.Y., a corporation of Delaware
No Drawing. Filed May 31, 1960, Ser. No. 32,572
12 Claims. (Cl. 260—6)

The present invention relates to the subbing of hydrophobic, dimensionally stable, inert-surface filmbases

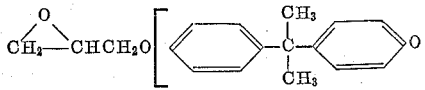 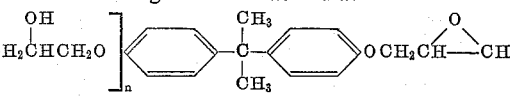

which per se refuse to bond to a hydrophilic overcoating such as a non-curl layer or a light-sensitive photographic silver halide emulsion and, more particularly, to the subbing of polycarbonate filmbase for the manufacture of light-sensitive silver halide film.

Polycarbonate resins have been known for some time. They may be made, for example, by reatcing diphenyl carbonate or phosgene with 2,2'bis(4-hydroxydiphenyl)-propane (generally known as bis-phenol A) or by reacting such bis-phenol A with its bis-chlorocarbonic acid ester. Polycarbonate resins and their preparation are described in a number of patents as, for example, Belgian Patents 532,543, 546,375, 546,376, 546,377, 553,614, 555,894 and 560,610; French Patents 1,152,155 and 1,152,156; German Patents 959,479 and 1,024,710; and U.S. Patent 2,799,666.

Polycarbonate resins have properties both physical and chemical which should highly recommend them for use as dimensionally stable, photographic filmbase. However, their use for this purpose is in its infancy. This is due to the difficulty of securing a strong wet and dry bond between the base and a hydrophilic coating needed in preparing light-sensitive photographic film such as a non-curl layer or a light-sensitive photographic emulsion, and the inadequacy of the usually employed photographic filmbase subs.

It has been previously proposed to sub polycarbonate filmbase and, in this connection, reference is made to U.S. Patent 2,874,046. However, in the preferred method of this patent, it was found necessary to use three layers for the sub, to wit, a polyester layer on the base, an intermediate nitrocellulose layer and a gelatin overcoating on the nitrocellulose layer. The use of three separate solutions to lay down these three individual coatings is manifestly costly and time-consuming.

I have now found that an excellent bond between the polycarbonate filmbase and a hydrophilic colloidal overcoating can be produced by a single layer sub while using as the subbing solution an aqueous-organic solvent composition containing as its essential components a lower alkylene carbonate, gelatin and a mixture of cellulose nitrate and an epoxy resin.

Such a solution and a single subbing layer produced from such solution and capable of forming a very tight bond either in the wet or dry stage between polycarbonate filmbase and a hydrophilic colloidal overcoating employed in manufacturing photographic film constitute the purposes and objects of my invention.

The use of the lower alkylene carbonate is absolutely essential to obatin adhesion between the colloidal overcoating and the filmbase. If the other components of my solution be employed but the lower alkylene carbonate be omitted, no adhesion can be obtained. Preferably, I use as the lower alkylene carbonate, propylene carbonate but resort may be had to ethylene carbonate although the results are not as good. The alkylene carbonate is usually present in an amount ranging from about 8 to 25% by volume of the coating solution. It should be noted that the lower alkylene carbonates, particularly propylene carbonate, are rather expensive solvents and it is possible to reduce the quantity of the same by the addition of other solvents such as methanol, ethanol, diacetone alcohol, acetone or butyl cellosolve.

Equally as important as the alkylene carbonate is the epoxy resin. These resins are prepared by the reaction of bisphenol A with epichlorohydrin and are considered to have the following structural formula:

Suitable epoxy resins for my purpose are those in which $n$ in the above formula is 0 or of a whole number such that the resin has a melting point as high as 155° C. The epoxy resins are capable of polymerization by cross linking or of esterification with organic acids. Such modification of the epoxy resins is referred to as curing. Curing may be effected by allowing the resin to stand, by heating the resin to a temperature of about 100° C. or preferably by the use of curing agents. Agents recommended for curing are organic amines such as diethylaminopropylamine, 3 - dimethylaminopropylamine, isopropylaminopropylamine, 3,3'-iminobis(propylamine), ethylene diamine, diethylenetriamine, the complex of boron trifluoride with ethylamine and peroxides such as benzoyl peroxide, t-butyl peroxide or the like.

The quantity of the epoxy resin employed will generally range from about 0.2 to 0.4 gram per 100 cc. of subbing solution.

The quantity of the curing agent when employed will be in very small amounts, say, .004 to .006 gram per 100 cc. of coating solution.

The epoxy resin in the subbing solution undergoes curing after coating, thereby effectively bonding the gelatin in the overcoat to the filmbase to promote excellent adhesion.

The subbing solution must also contain gelatin usually in an amount of from about 1 to .5 gram per 100 cc. of the coating solution. The gelatin has the important funtion of imparting a degree of water receptivity to an otherwise hydrophobic coating. This aids in bonding the filmbase to a hydrophilic colloidal overcoating on the subbing layer needed to produce a light-sensitive photographic film.

Finally, the subbing solution must contain cellulose nitrate to supplement or promote the adhesion effect contributed by the epoxy resin upon curing. The cellulose nitrate is generally used in about the same quantities as the epoxy resin.

To improve the bonding of the substrate to the hydrophilic colloidal overcoating thereon, it is advisable to use a small amount of glyoxal dissolved in an aqueous organic solvent such as a mixture of water and methanol. The glyoxal serves to cross-link the gelatin in the substrate with the gelatin in the overcoat on the substrate. The quantity of glyoxal needed is very small, usually amounting to from about .003 to about .0075 gram per 100 cc. of coating solution.

Different organic solvents may be used in making up the subbing solution. Preferably, we employ diacetone alcohol but there also may be used propylene dichloride, mesityl oxide, methanol, glacial acetic acid or the like. The solvents should be such as to maintain the various ingredients in solution until coating and drying of the substrate. The quantity of the solvent may vary from about 8 to 65% by volume of the subbing solution.

The solvent system employed is primarily organic and, hence, it is desirable to use a dispersing agent to disperse the gelatin in the subbing solution. To this end, resort may be had to an organic acid such as phthalic acid, acetic acid, salicylic acid or the like. The quantity of the acid used for dispersing the gelatin amounts to about .5 to .2 gram per 100 cc. of the subbing solution.

In preparing the subbing solution, we have found it advisable to make up the solution in three parts, Part 1 of which contains the gelatin; Part 2 the propylene carbonate and the curing agent for the epoxy resin; and Part 3 the cellulose nitrate and epoxy resin. Part 1 is warmed and added to Part 2 with stirring. Part 3 is then added to the resulting solution of Parts 1 and 2. The subbing solution may also be prepared by adding Part 3 to Part 2 and adding the warmed Part 1 to the solution of Parts 2 and 3. The solution may then be coated in a conventional manner on the polycarbonate filmbase and the coating dried. Hydrophilic colloids such as photographic silver halide emulsions or gelatin overcoatings may then be laid down on the substrate and dried. It will be found that the gel overcoating is tightly bonded to the substrate and the latter to the polycarbonate filmbase in both wet and dry condition.

The invention will be further illustrated by the following examples, but it is to be understood that the invention is not restricted thereto.

EXAMPLE I

Part 1

.17 gram of gelatin was dissolved in 1.99 milliliters of water and to this solution were added 2.48 milliliters of a 10% solution of phthalic acid in methanol and 4.95 milliliters of methanol.

Part 2

20.46 milliliters of propylene carbonate were added to 41.45 milliliters of methanol, .13 milliliter of a 4% solution of glyoxal in methanol and 20.90 milliliters of glacial acetic acid.

Part 3

3.70 milliliters of a 10% solution of 15 to 20 sec. RS cellulose nitrate in acetone were added to 3.70 milliliters of a 10% solution of a liquid epoxy resin having a viscosity at 25° C. according to Gardner-Holdt of 100 to 160 poises and an epoxide equavalent (grams of resin containing 1 gram-equivalent of epoxide) of 100 to 160.

The resulting solution from admixing Parts 1, 2 and 3 was coated on polycarbonate film at 2 feet per minute. One-half of the subbed film was placed in an oven for one hour at 100° C. and then both halves were coated with a light-sensitive gelatino-silver halide emulsion and processed simultaneously. The uncured half showed a wet and dry adhesion considered unsatisfactory while the cured portion showed excellent wet and dry scribed adhesion tests.

EXAMPLE II

Part 1

| | | |
|---|---|---|
| Gelatin | grams | .75 |
| Water | milliliters | 1.99 |
| 10% phthalic acid in methanol | do | 2.48 |
| Methanol | do | 4.92 |

Part 2

| | | |
|---|---|---|
| Propylene carbonate | milliliters | 20.34 |
| Diacetone alcohol | do | 20.34 |
| Methanol | do | 41.21 |
| 4% solution of glyoxalmethanol | do | .13 |
| 1% solution of the boron trifluoride complex of monoethylamine | do | 1.12 |

Part 3

| | | |
|---|---|---|
| 10% solution in acetone of 15–20 sec. RS cellulose nitrate | milliliters | 3.74 |
| 10% solution in acetone of the epoxy resin of Example I | do | 3.74 |

Part 1 is added to Part 2 and Part 3 added to the solution obtained with Parts 1 and 2. The resulting solution was coated on polycarbonate filmbase at a rate of 2.5 feet per minute. The subbed film was coated with a graphic arts silver halide emulsion, processed and scribed to test the adhesion. Cellophane adhesion tape could not remove any emulsion from the scribed test areas.

EXAMPLE III

Part 1

| | | |
|---|---|---|
| Gelatin | milliliters | .75 |
| Water | do | 1.99 |
| 10% solution of phthalic acid in methanol | do | 2.46 |
| Methanol | do | 4.92 |

Part 2

| | | |
|---|---|---|
| Propylene carbonate | milliliters | 20.34 |
| Methanol | do | 41.21 |
| 4% solution of glyoxal in methanol | do | .13 |
| Mesityl oxide | do | 20.07 |

Part 3

| | | |
|---|---|---|
| 10% solution in acetone of 5–6 sec. SS cellulose nitrate | milliliters | 3.8 |
| 10% solution in acetone of an epoxy resin having a melting point of 65–75° C. | do | 3.8 |

Part 1 was combined with Parts 2 and 3 with the solution from Parts 1 and 2. The resulting solution was coated on polycarbonate filmbase at 5.9 feet per minute and evaluated in the same manner as in Example II. All adhesion tests were satisfactory.

EXAMPLE IV

The procedure was the same as that in Example III excepting that the mesityl oxide was replaced by 20.07 milliliters of propylene dichloride. When the resulting subbing solution was coated as in Example III and tested, all tests were found to be acceptable.

EXAMPLE V

Part 1

| | | |
|---|---|---|
| Gelatin | grams | .17 |
| Water | milliliters | 1.99 |
| 10% solution of phthalic acid in methanol | do | 2.46 |
| Methanol | do | 4.92 |

Part 2

| | | |
|---|---|---|
| Propylene carbonate | milliliters | 19.53 |
| Diacetone alcohol | do | 19.27 |
| Methanol | do | 39.58 |
| 4% solution of glyoxal in methanol | do | .13 |
| 1% solution in methanol of boron trifluoride complex with monoethylamine | do | .77 |

Part 3

| | | |
|---|---|---|
| 10% solution in acetone of 5–6 sec. SS cellulose nitrate | milliliters | 2.57 |
| 10% solution in acetone of the epoxy resin of Example III | do | 2.57 |

The subbing solution was made up by adding Parts 1 and 2 together and then adding Part 3 to the solution from Parts 1 and 2.

The subbing solution was coated as in Example III. The subbed film had less haze. The emulsion adhesion did not decrease with the lowered resin content of this example.

EXAMPLE VI

Part 1

| | | |
|---|---|---|
| Gelatin | grams | .75 |
| Water | milliliters | 1.99 |
| 10% solution of phthalic acid in methanol | do | 2.46 |
| Methanol | do | 4.92 |

Part 2

| | | |
|---|---|---|
| Propylene carbonate | milliliters | 9 |
| Diacetone alcohol | do | 11.57 |
| Methanol | do | 56.54 |
| 4% solution of glyoxal in methanol | do | .13 |
| 1% solution of the curing agent of Example II | do | .77 |

Part 3

| | | |
|---|---|---|
| 10% solution in acetone of 5–6 sec. SS cellulose nitrate | milliliters | 2.57 |
| 10% solution in acetone of the epoxy resin of Example III | do | 2.75 |

When a solution of the above components was coated as in Example II, satisfactory emulsion adhesion was obtained despite the decrease in the content of active solvents.

EXAMPLE VII

Part 1

| | | |
|---|---|---|
| Gelatin | grams | .75 |
| Water | milliliters | 1.99 |
| 10% solution of phthalic acid in methanol | do | 2.46 |
| Methanol | do | 4.92 |

Part 2

| | | |
|---|---|---|
| Propylene carbonate | milliliters | 9.56 |
| Diacetone alcohol | do | 12.29 |
| Methanol | do | 60.11 |
| 1% solution in methanol of the curing agent of Example II | do | 1.64 |

Part 3

| | | |
|---|---|---|
| 10% solution in acetone of 5–6 sec. SS cellulose nitrate | milliliters | 2.73 |
| 10% solution in acetone of the epoxy resin of Example III | do | 2.73 |

The subbing solution prepared from the above components was coated on a production subbing machine at 3.2 feet per minute. The subbed layer contained no hazing, did not adhere to itself when the film was rolled up and gave excellent adhesion when coated with a photographic silver halide emulsion before, during and after processing.

EXAMPLE VIII

Part 1

| | | |
|---|---|---|
| Gelatin | grams | .75 |
| Water | milliliters | 1.99 |
| 10% solution of phthalic acid in methanol | do | 2.46 |
| Methanol | do | 4.92 |

Part 2

| | | |
|---|---|---|
| Propylene carbonate | milliliters | 9.56 |
| Diacetone alcohol | do | 9.56 |
| Methanol | do | 62.84 |
| 1% solution in methanol of the curing agent of Example II | milliliters | 1.64 |

Part 3

| | | |
|---|---|---|
| 10% solution in acetone of 5–6 sec. SS cellulose nitrate | milliliters | 2.73 |
| 10% solution in acetone of the epoxy resin of Example III | milliliters | 2.73 |

One sample of the subbing solution prepared from the above components was aged for at least three weeks before subbing polycarbonate filmbase which was subsequently coated with a photographic silver halide emulsion. Another sample of the solution was boiled under reflux for four days before subbing the polycarbonate base and coating the same with the silver halide emulsion. Neither aging nor boiling the solution affected the adhesion of the emulsion to the filmbase.

EXAMPLE IX

The procedure was the same as in Example VII excepting that the epoxy resin used had a melting point of 145 to 155° C. The subbing solution was as effective as that of any of the other examples.

Modifications of the invention will occur to persons skilled in the art. Thus, in lieu of the curing agent of the examples, resort may be had to an equivalent quantity of the peroxide or amine curing agents previously mentioned. Attention is directed to the article on epoxy resins, page 89 of "Modern Plastics Encyclopedia Issue for 1960" (September 1959) which describes the ability of the amine curing agents to effect cross-linking of the epoxy resins. As previously explained, such cross-linking can also be obtained by heating as in Example I or by aging. Furthermore, while I have illustrated my invention primarily in connection with polycarbonate filmbase, it is to be understood that my subbing solution may also be used with other inert-surfaced bases such as polyester filmbase or polystyrene filmbase. I, therefore, do not intend to be limited in the patent granted except as necessitated by the appended claims.

I claim:

1. A dimensionally stable, inert-surfaced filmbase carrying a single substrate layer for bonding a hydrophilic colloid layer to the filmbase comprising gelatin, cellulose, nitrate and an epoxy resin resulting from the condensation of Bisphenol A with epichlorhydrin prepared by coating said gelatin, cellulose nitrate and epoxy resin in a solvent of a lower alkylene carbonate on said filmbase and drying to remove said solvent.

2. The article as defined in claim 1 wherein the filmbase is a polycarbonate.

3. A subbing solution for an inert-surfaced filmbase comprising an aqueous organic solvent solution comprising gelatin, cellulose nitrate and an epoxy resin resulting from the condensation of Bisphenol A with epichlorhydrin dispersed in an aqueous propylene carbonate solvent.

4. The solution defined in claim 3 wherein the solution contains diacetone alcohol as an additional organic solvent.

5. The solution as defined in claim 3 in which a curing agent for the epoxy resin is present.

6. A solution for subbing polycarbonate filmbase comprising an aqueous organic solvent solution containing gelatin, cellulose nitrate, an epoxy resin resulting from the condensation of Bisphenol A with epichlorhydrin and a small amount of phthalic acid dispersed in an aqueous solvent comprising propylene carbonate, diacetone alcohol and methanol.

7. The solution as defined in claim 6 wherein a curing agent for the epoxy resin is present.

8. The solution as defined in claim 7 wherein the curing agent is the complex of boron trifluoride with chloroethylamine.

9. A solution for subbing filmbase comprising an aqueous organic solvent solution containing gelatin, cellulose nitrate, an epoxy resin resulting from the condensation of Bisphenol A with epichlorhydrin and a small amount of phthalic acid dispersed in an aqueous solvent comprising propylene carbonate, diacetone alcohol and methanol.

10. The process of subbing an inert-surfaced film base to receive a hydrophilic coating which comprises coating said base with an aqueous organic solvent solution comprising as the solvent water and a lower alkylene carbonate as the solute, gelatin, cellulose nitrate and an epoxy resin resulting from the condensation of Bisphenol A and epichlorhydrin and drying to remove the water and lower alkylene carbonate.

11. The process as defined in claim 10 wherein the inert-surfaced filmbase is a polycarbonate film.

12. The process as defined in claim 10 wherein the alkylene carbonate is propylene carbonate.

(References on following page)

References Cited by the Examiner

UNITED STATES PATENTS

| | | | |
|---|---|---|---|
| 2,096,675 | 10/37 | Babcock | 96—87 |
| 2,110,496 | 3/38 | Babcock | 96—87 |
| 2,703,284 | 3/55 | White et al. | 96—87 |
| 2,872,318 | 2/59 | Stark | 117—34 |
| 3,023,101 | 2/62 | Ossenbrunner et al. | 96—87 |

OTHER REFERENCES

Golding: Polymers and Resins, pp. 355–360, D. Von Nostrand Co., Inc., New York, 1959.

NORMAN G. TORCHIN, *Primary Examiner.*

PHILIP E. MANGAN, LOUISE P. QUAST, *Examiners.*